(12) United States Patent
Carston et al.

(10) Patent No.: US 9,002,825 B2
(45) Date of Patent: *Apr. 7, 2015

(54) ESTIMATING ROWS RETURNED BY RECURSIVE QUERIES USING FANOUT

(71) Applicant: International Business Machines Corporation, Armonk, NY (US)

(72) Inventors: Lynnette E. Carston, Rochester, MN (US); Brian R. Muras, Rochester, MN (US); Andrew P. Passe, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 43 days.

This patent is subject to a terminal disclaimer.

(21) Appl. No.: 13/796,194

(22) Filed: Mar. 12, 2013

(65) Prior Publication Data

US 2014/0101133 A1    Apr. 10, 2014

Related U.S. Application Data

(63) Continuation of application No. 13/645,714, filed on Oct. 5, 2012, now Pat. No. 8,700,605.

(51) Int. Cl.
*G06F 17/30* (2006.01)

(52) U.S. Cl.
CPC .... *G06F 17/30463* (2013.01); *G06F 17/30469* (2013.01)

(58) Field of Classification Search
CPC ............ G06F 17/30327; G06F 17/30442; G06F 17/30463; G06F 17/30424; G06F 17/30392; G06F 17/30433; G06F 17/30469; G06F 17/30513
USPC ................................. 707/713, 718, 719, 720
See application file for complete search history.

(56) References Cited

U.S. PATENT DOCUMENTS

| 5,875,334 | A | 2/1999 | Chow et al. |
| 6,480,857 | B1 | 11/2002 | Chandler |
| 7,337,167 | B2 | 2/2008 | Muras |
| 7,840,592 | B2 | 11/2010 | Muras |
| 2003/0126127 | A1 | 7/2003 | Abdo |
| 2004/0122825 | A1 | 6/2004 | Pulaski |
| 2004/0225639 | A1 | 11/2004 | Jakobsson et al. |
| 2006/0235818 | A1 | 10/2006 | Muras |
| 2007/0239691 | A1 * | 10/2007 | Ordonez et al. ............ 707/3 |
| 2008/0071754 | A1 | 3/2008 | Muras |
| 2008/0228710 | A1 | 9/2008 | Muras |
| 2013/0080474 | A1 * | 3/2013 | Zhang et al. ............ 707/797 |

* cited by examiner

*Primary Examiner* — Debbie Le
(74) *Attorney, Agent, or Firm* — Owen J. Gamon; James R. Nock (57) ABSTRACT

In an embodiment, a recursive query is received that comprises a first select statement with a seed select statement and a second select statement with a recursive reference, wherein the recursive query further identifies at least two columns in at least one table, wherein the at least two columns have parent-child relationships represented by nodes in a graph, wherein the graph represents the organization of values in rows in the at least one table. A target recursion depth is calculated for the graph based on a fanout of the graph. In an embodiment, the target recursion depth is calculated by summing the fanout at each recursion depth of the graph multiplied by a number of nodes at each recursion depth of the graph. An estimated number of rows that the recursive query will return is estimated based on the target recursion depth.

14 Claims, 4 Drawing Sheets

ESTIMATING ROWS RETURNED BY RECURSIVE QUERIES USING FANOUT

CROSS-REFERENCE TO RELATED APPLICATIONS

This application is a continuation of U.S. patent application Ser. No. 13/645,714, filed Oct. 5, 2012, entitled "ESTIMATING ROWS RETURNED BY RECURSIVE QUERIES USING FANOUT," and incorporated by reference herein in its entirety.

FIELD

This invention generally relates to computer database management systems and more specifically relates to estimating rows returned by recursive queries.

BACKGROUND

Computer systems typically comprise a combination of computer programs and hardware, such as semiconductors, transistors, chips, circuit boards, storage devices, and processors. The computer programs are stored in the storage devices and are executed by the processors. Fundamentally, computer systems are used for the storage, manipulation, and analysis of data.

One mechanism for managing data is called a database management system (DBMS) or simply a database. Many different types of databases are known, but the most common is usually called a relational database, which organizes data in tables that have rows, which represent individual entries, tuples, or records in the database, and columns, fields, or attributes, which define what is stored in each entry, tuple, or record. Each table has a unique name or identifier within the database and each column has a unique name within the particular table. The database may also have one or more indexes, which are data structures that inform the DBMS of the location of a certain row in a table given an indexed column value, analogous to a book index informing the reader of the page on which a given word appears.

The most common way to retrieve data from a database is through statements called database queries, which may originate from user interfaces, application programs, or remote computer systems, such as clients or peers. A query is an expression evaluated by the DBMS, in order to retrieve data from the database that satisfies or meets the criteria or conditions specified in the query. Although the query requires the return of a particular data set in response, the method of query execution is typically not specified by the query. Thus, after the DBMS receives a query, the DBMS interprets the query and determines what internal steps are necessary to satisfy the query. These internal steps may comprise an identification of the table or tables specified in the query, the row or rows selected in the query, and other information such as whether to use an existing index, whether to build a temporary index, whether to use a temporary file to execute a sort, and/or the order in which the tables are to be joined together to satisfy the query. When taken together, these internal steps are referred to as a query plan (QP), a query execution plan (QEP), a query access plan (QAP), or an access plan (AP). The DBMS often saves the query plan and reuses it when the user or requesting program repeats the query, which is a common occurrence, instead of undergoing the time-consuming process of recreating the query plan.

The DBMS may create many different access plans for any one query, each of which returns the required data set, yet the different access plans may provide widely different performance. Thus, especially for large databases, the access plan selected by the DBMS needs to provide the required data at a reasonable cost, in terms of time and hardware resources. Hence, the DBMS often creates multiple prospective access plans and then chooses the best, or least expensive one, to execute.

One factor that contributes to the cost of a particular access plan is the number of rows that a query using that access plan returns from a database table. A query that returns a large number of rows may run most efficiently with one access plan, while a query that returns only a small number of rows may run most efficiently with a different access plan. Hence, in an attempt to choose the best access plan for a particular query, current query optimizers estimate the number of rows that the query will return when executed based on the number of unique values in a column of the table to which the query is directed. This number of unique values is called the cardinality of the column.

One type of query is called a recursive query, which returns rows that have relationships to an arbitrary depth in a table, which provides an easy way of traversing tables that represent tree or graph data structures. For example, given a table that represents the reporting relationships within a company, a recursive query may return all workers that report, directly or indirectly, to one particular person. Recursive queries typically contain an initial sub-query, a seed, and a recursive sub-query that, during each iteration, appends additional rows to the result set. An example of a recursive query is the SQL (structured query language) recursive common table expression (RCTE).

SUMMARY

A computer-readable storage medium and computer are provided. In an embodiment, a recursive query is received that comprises a first select statement with a seed select statement and a second select statement with a recursive reference, wherein the recursive query further identifies at least two columns in at least one table, wherein the at least two columns have parent-child relationships represented by nodes in a graph, wherein the graph represents the organization of values in rows in the at least one table. A target recursion depth is calculated for the graph based on a fanout of the graph. In an embodiment, the target recursion depth is calculated by summing the fanout at each recursion depth of the graph multiplied by a number of nodes at each recursion depth of the graph. An estimated number of rows that the recursive query will return is estimated based on the target recursion depth. A selected query plan is selected from among a plurality of query plans based the estimated number of rows.

It is to be noted, however, that the appended drawings illustrate only example embodiments of the invention, and are therefore not considered a limitation of the scope of other embodiments of the invention.

DETAILED DESCRIPTION

Figure 1:
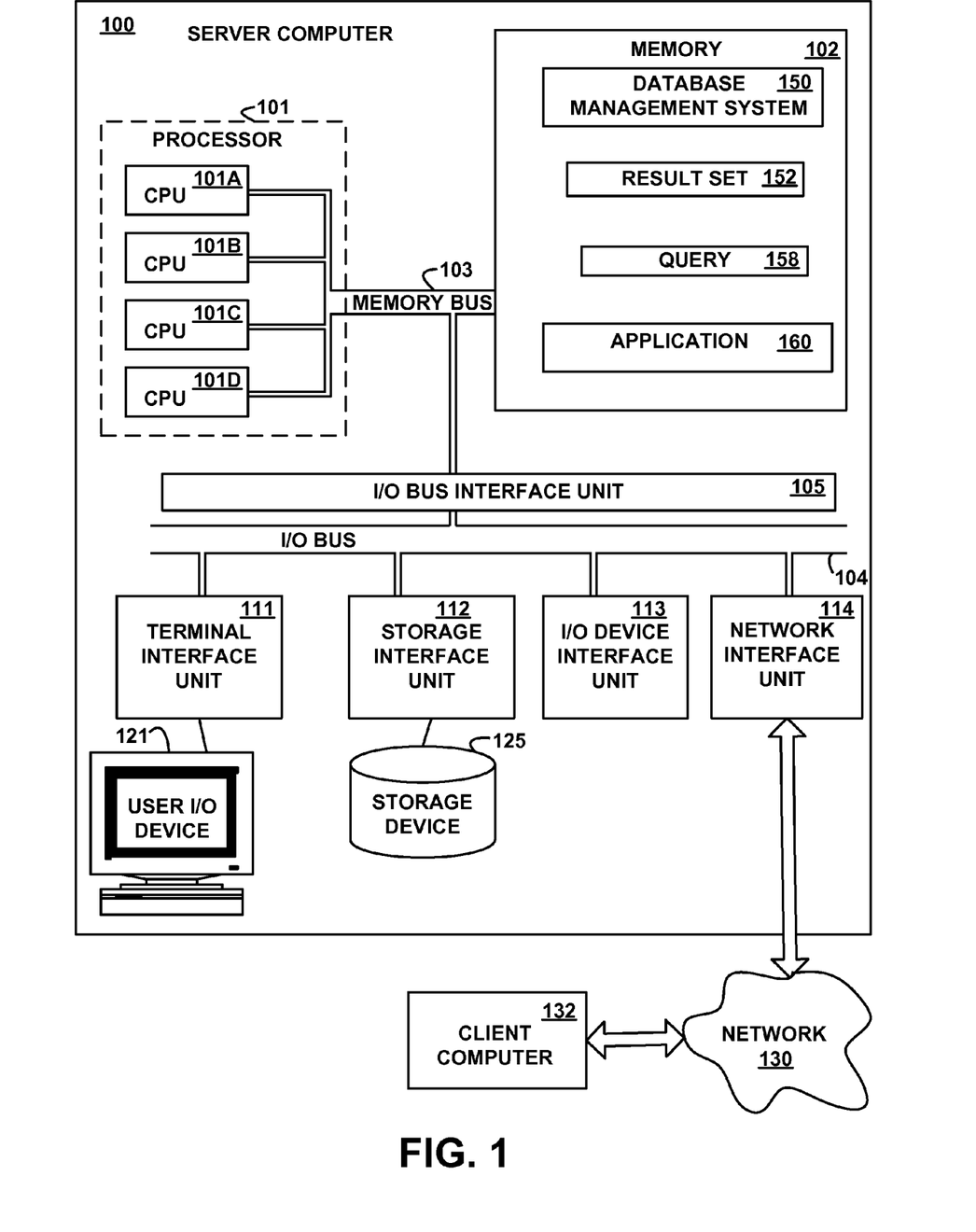
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The terms "server" and "client" are used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the server computer system 100 comprise one or more processors 101, a memory 102, a terminal interface unit 111, a storage interface unit 112, an I/O (Input/Output) device interface unit 113, and a network interface unit 114, all of which are communicatively coupled, directly or indirectly, for inter-component communication via a memory bus 103, an I/I bus 104, and an I/O bus interface unit 105.

The server computer system 100 contains one or more general-purpose programmable central processing units (CPUs) 101A, 101B, 101C, and 101D, herein generically referred to as the processor 101. In an embodiment, the server computer system 100 contains multiple processors typical of a relatively large system; however, in another embodiment the server computer system 100 may alternatively be a single CPU system. Each processor 101 executes instructions stored in the memory 102 and may comprise one or more levels of on-board cache.

In an embodiment, the memory 102 may comprise a random-access semiconductor memory, storage device, or storage medium (either volatile or non-volatile) for storing or encoding data and programs. In another embodiment, the memory 102 represents the entire virtual memory of the server computer system 100, and may also include the virtual memory of other computer systems coupled to the server computer system 100 or connected via the network 130. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 stores or encodes a database management system (DBMS) 150, a result set 152, a query 158, and an application 160. Although the database management system 150, the result set 152, the query 158, and the application 160 are illustrated as being contained within the memory 102 in the server computer system 100, in other embodiments some or all of them may be on different computer systems and may be accessed remotely, e.g., via the network 130. For example, the database management system 150, the result set 152, the query 158, and the application 160 may be stored in memory in the client computer 132. The server computer system 100 may use virtual addressing mechanisms that allow the programs of the server computer system 100 to behave as if they only have access to a large, single storage entity instead of access to multiple, smaller storage entities. Thus, while the database management system 150, the result set 152, the query 158, and the application 160 are illustrated as being contained within the memory 102, these elements are not necessarily all completely contained in the same storage device at the same time. Further, although the database management system 150, the result set 152, the query 158, and the application 160 are illustrated as being separate entities, in other embodiments some of them, portions of some of them, or all of them may be packaged together.

In an embodiment, the DBMS 150 and/or the application 160 comprise instructions or statements that execute on the processor 101 or instructions or statements that are interpreted by instructions or statements that execute on the processor 101, to carry out the functions as further described below with reference to FIGS. 2, 3, and 4. In another embodiment, the DBMS 150 and/or the application 160 are implemented in hardware via semiconductor devices, chips, logical gates, circuits, circuit cards, and/or other physical hardware devices in lieu of, or in addition to, a processor-based system. In an embodiment, the DBMS 150 and/or the application 160 comprise data, in addition to instructions or statements.

The memory bus 103 provides a data communication path for transferring data among the processor 101, the memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the server computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the memory 102, or any portion thereof, may be stored to and retrieved from the storage device 125, as needed. The I/O device interface unit 113 provides an interface to any of various other input/output devices or devices of other types, such as printers or fax machines. The network interface unit 114 provides one or more communications paths from the server computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the memory 102, and the I/O bus interface unit 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 105 and the I/O bus 104 are shown as single respective units, the server computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the server computer system 100 is a multi-user mainframe computer system, a single-user system, or a server computer or similar device that has little or no direct user interface, but receives requests from other computer systems (clients). In other embodiments, the server computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the server computer system 100 and the client computer system 132. In various embodiments, the network 130 may represent a storage device or a combination of storage devices, either connected directly or indirectly to the server computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The client computer system 132 may comprise some or all of the hardware and/or computer program elements of the server computer system 100. In an embodiment, the application 160 may be stored in a storage device at the client computer 132, may execute on a processor at the client computer 132, and may send the queries 158 to and receive the result sets 152 from the server computer system 100 via the network 130.

FIG. 1 is intended to depict the representative major components of the server computer system 100, the network 130, and the client computer system 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the server computer system 100 and that, when read and executed by one or more processors in the server computer system 100 or when interpreted by instructions that are executed by one or more processors, cause the server computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
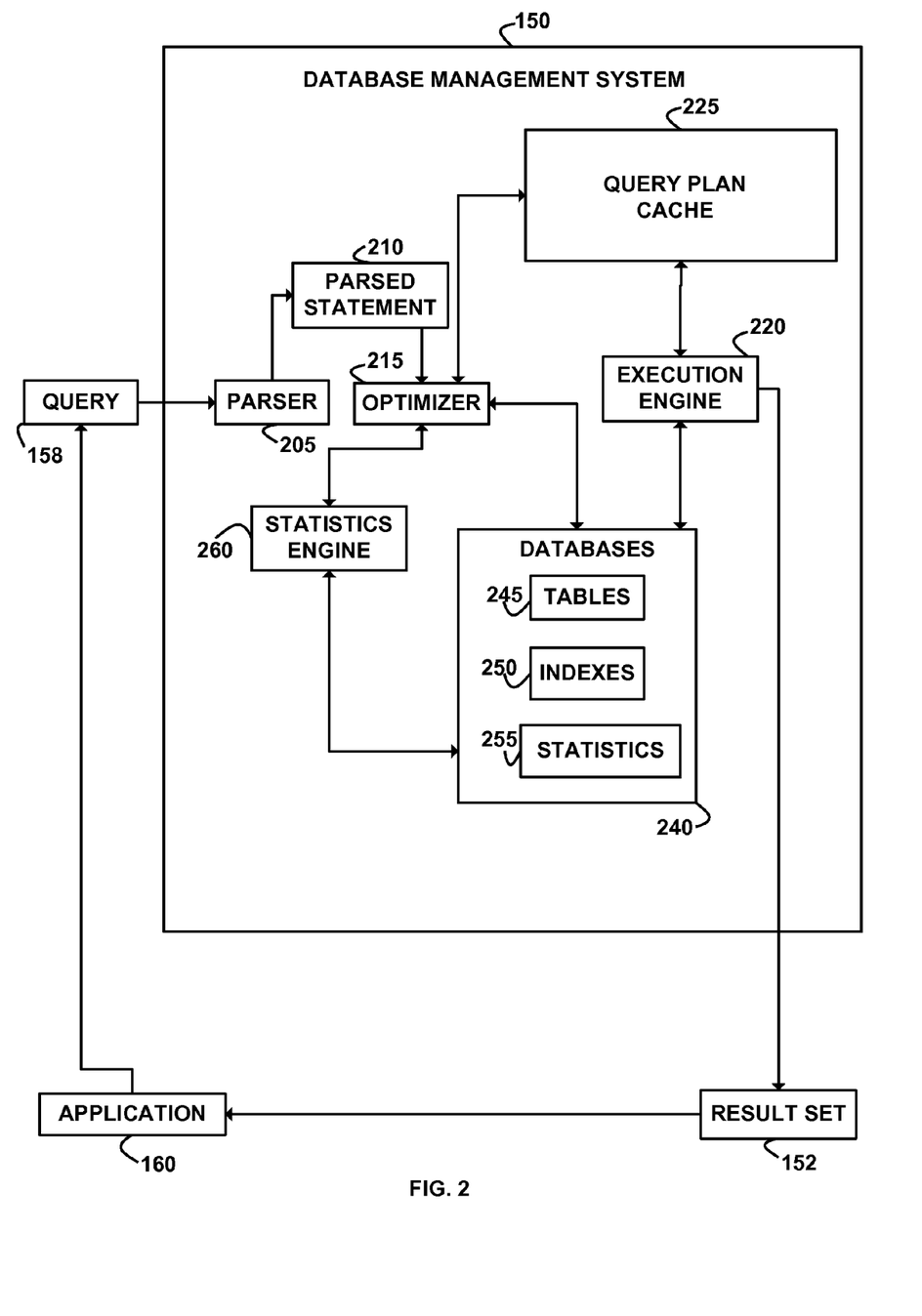
FIG. 2 depicts a block diagram of an example database management system, according to an embodiment of the invention.

FIG. 2 depicts a block diagram of an example database management system 150, according to an embodiment of the invention. The DBMS 150 comprises a parser 205, a parsed statement 210, an optimizer 215, an execution engine 220, a query plan cache 225, a database 240, and a statistics engine 260.

The database 240 comprises tables 245, optional indexes 250, and statistics 255. The tables 245 organize data in rows, which represent individual entries, tuples, or records and columns, fields, or attributes, which define what is stored in each row, entry, tuple, or record. Each table 245 has a unique name or identifier within a database 240 (but not necessarily a unique name across all databases) and each column has a unique name within the particular table 245. The indexes 250 are data structures that inform the DBMS 150 of the location of a certain row in a table 245, in response to the indexes 250 receiving an indexed column value. In various embodiments, examples of the statistics 255 comprise a summary of the data values in the rows, a frequent values list (e.g., a list of the values that exist most frequently in a table), a unique value count (e.g., a count for each value of the number of times that the value exists in the table and/or column), a histogram of the values (e.g., a count of the number of times that each value exists in the table or column), a number of rows in the tables, and/or a fanout of the rows in the tables. The statistics engine 260 collects and/or calculates the statistics 255.

The parser 205 in the DBMS 150 receives the query 158 from the application 160. The query 158 requests that the DBMS 150 search for or find a row or combination of rows of data from the tables 245 and store the data from those found rows into the result set 152 that meet or satisfy the criteria, keys, and or values specified by the query 158. In an embodiment, the application 160 sends the same query 158 multiple times to the DBMS 150, which may or may not result in a different result set 152, depending on whether the data in the DBMS 150 has changed between occurrences of the query 158 or whether different values are passed into the query 158 via parameter markers or host variables. In an embodiment, the application 160 sends different queries 158 to the DBMS 150. The parser 205 generates a parsed statement 210 from the query 158, which the parser 205 sends to the optimizer 215. The optimizer 215 performs query optimization on the parsed statement 210. As a part of query optimization, the optimizer 215 generates one or more query plans and stores them to the query plan cache 225, using data such as the statistics 255, resource availability, platform capabilities, query content information, etc., that is stored in the database 240. The optimizer 215 sends a request to the statistics engine 260, which requests the statistics engine 260 to calculate an estimated number of returned rows that execution of a query plan will return to the result set 152. The statistics engine 260 calculates the estimated number of returned rows that execution of a query plan will return to the result set 152 from the query 158, the tables 245, and the statistics 255 and returns the estimated number of returned rows to the optimizer 215.

The optimizer 215 may use the statistics 255 and the estimated number of returned rows to select the best query plan for the query 158 from the query plans in the query plan cache 225. For example, the optimizer 215 may select a query plan that randomly accesses or reads rows using an index if the estimated number of returned rows is small (less than a threshold), but may instead select a different query plan that scans rows from tables in sequential address order if the estimated number of returned rows is large (greater than a threshold) because better performance of the query 158 will result.

The execution engine 220 reads the selected query plan from the query plan cache 225 and executes the selected query plan, optionally using the indexes 250, in order to find and retrieve the data from the tables 245 that satisfies the criteria of the query 158. The execution engine 220 stores the resultant data that satisfies the criteria specified by the query 158 into the result set 152, which the DBMS 150 returns to the application 160, as a response to the query 158.

Although FIG. 2 illustrates the query plan cache 225 as being contained within the DBMS 150, in another embodiment, the application 160 comprises the query plan cache 225. In various embodiments, each application 160 has its own query plan cache 225 within the respective application 160, each application 160 has its own query plan cache 225 outside the respective application 160, or the applications 160 share the same query plan cache 225. The query plan cache 225 may be scoped system wide, application wide, object wide, to a thread, or any other scoping criteria. In various embodiments, the application 160 is a user application, a third-party application, an operating system, or any portion, multiple, or combination thereof. In an embodiment, the query plan cache 225 may be in an SQL (Structured Query Language) package. In various embodiment, the query plan cache 225 may be stored on the same server computer system 100 as the DBMS 150, may execute in the same or a different virtual machine as the DBMS 150, or may be stored on a different computer from the DBMS 150 and accessed, e.g., via the network 130.

Figure 3:
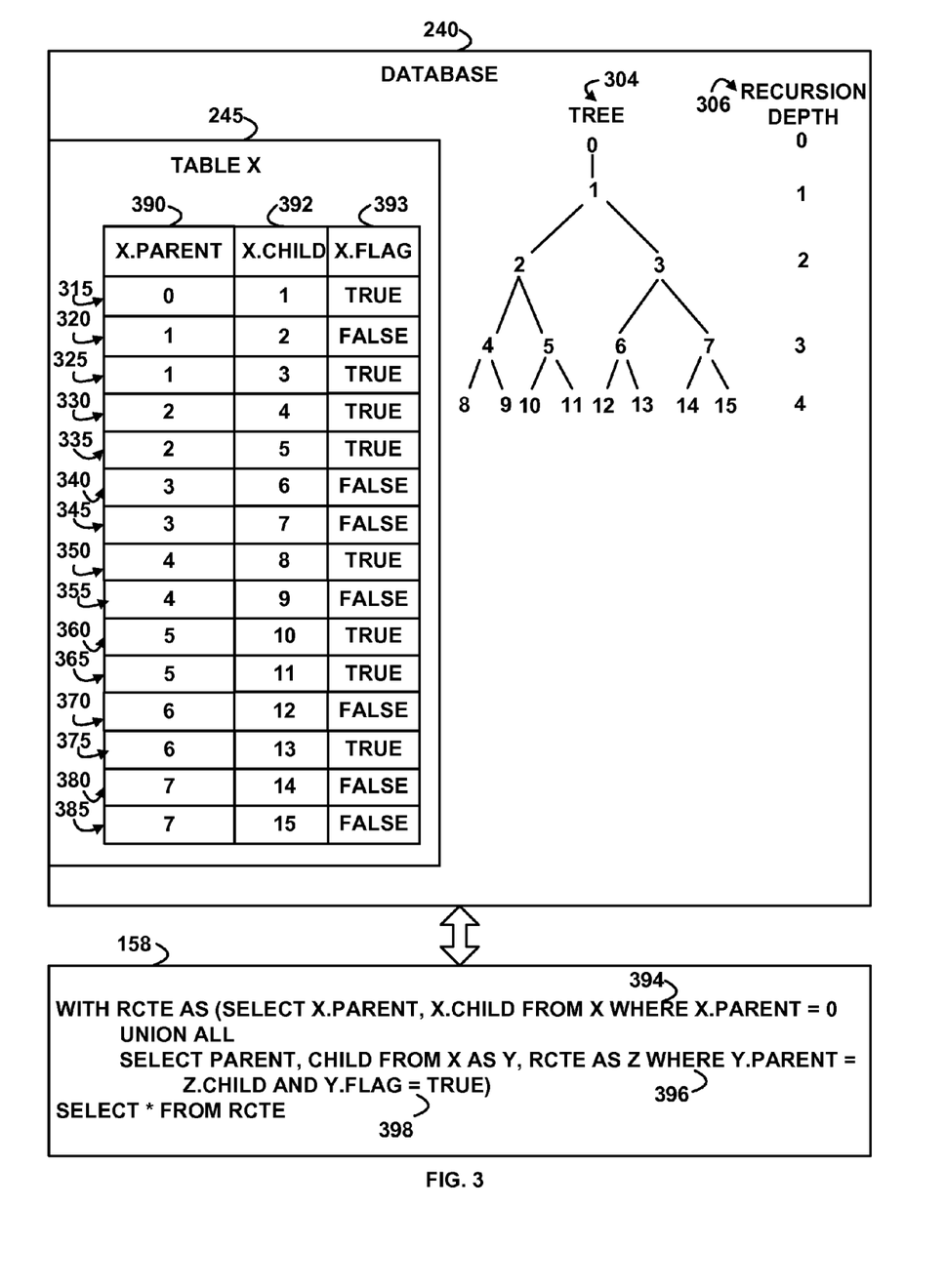
FIG. 3 depicts a block diagram of the interaction of an example database with a recursive query, according to an embodiment of the invention.

FIG. 3 depicts a block diagram of the interaction of an example database 240 with a recursive query 158, according to an embodiment of the invention. The example database 240 comprises a table x 245, which comprises example entries or rows 315, 320, 325, 330, 335, 340, 345, 350, 355, 360, 365, 370, 375, 380, and 385, each of which comprises an example columns or keys of x.parent 390, x.child 392, and x.flag 393. Although the keys 390, 392, and 393 are illustrated as being all contained within the same table x 245, in another embodiment, some or all of the keys 390, 392, and 393 may be in different tables from each other.

The recursive query 158 comprises a seed select statement 394 of "x.parent=0," a recursive select statement 396 of "rcte as z where y.parent=z.child" and another or third select statement 398 of "y.flag=true." The recursive query 158 renames the physical table x 245 as logical tables y and z. The seed select statement 394 specifies the row value in the column of the table at which the recursive select starts. Although the recursive query 158 is illustrated with one recursive select statement 396, in other embodiments any number of recursive select statements may be present.

The tree 304 graphically illustrates the relationship of the data values in the rows of the x.parent 390 and x.child 392 columns within the table x 245, as defined by the recursive query 158. Thus, "0" in the tree 304 is the parent of "1," as illustrated in row 315; "1" in the tree 304 is the parent of "2" and "3," as illustrated in rows 320 and 325; "2" in the tree 304 is the parent of "4" and "5," as illustrated in rows 330 and 335; "4" is the parent of "8" and "9," as illustrated in rows 350 and 355; "5" is the parent of "10" and "11", as illustrated in rows 360 and 365; "3" is the parent of "6" and "7," as illustrated in rows 340 and 345; "6" is the parent of "12" and "13," as illustrated in rows 370 and 375; and "7" is the parent of "14" and "15," as illustrated in rows 380 and 385.

The names "x.parent" and "x.child" are used for convenience of illustration only, any names or identifiers may be used to identify the columns in the table x 245, and the names "x.parent" and "x.child" do not impose, create, or define a parent-child relationship on the table x 245. Instead, the recursive query 158 imposes, creates, or defines a parent-child relationship on the table x 245, as represented graphically by the tree 304. The recursive query 158 creates the parent-child relationship by specifying that the value from the z.child column that is returned by each read of the table is to be used to find (match) the y.parent value of the next read. Further, in an embodiment, the recursive query 158 specifies the parent-child relationships in the tree 304 that represent the table x 245 without the presence of an index 250 over the table x 245, or if an index 250 over the table x 245 exists, without using such an index 250.

The recursion depth 306 specifies the depth of the recursive reads (as specified by the recursive query 158) needed to read the respective values from the respective rows in table x 245, as represented by the tree 304. Thus, "0" in the tree 304 is at the recursion depth 306 of "0" because no recursive read is necessary to obtain the value of x.parent="0" because it is specified as the seed by the seed select statement 394. Further, "1" in the tree 304 is at the recursion depth 306 of "1" because, in response to the seed select 394, the DBMS 150 reads row 315 and finds a x.child 392 value of "1." Further, "2" and "3" in the tree 304 are at the recursion depth 306 of "2" because, in response to reading the row 315 and finding the x.child 392 value of "1," the DBMS 150 reads the rows 320 and 325, to find the x.parent 390 values of "1" that match the x.child 392 value of "1," and reads the x.child 392 values of "2" and "3" from the rows 320 and 325. This process of recursive reading of rows and finding parent values that match child values of previous reads continues for the recursion depth 306 of "3" and "4."

A tree takes its name from an analogy to trees in nature, which have a hierarchical organization of branches and leaves. For example, a leaf is connected to a small branch, which further is connected to a large branch, and all branches of the tree have a common starting point at the root. Analogously, the nodes (represented by the data values of "0," "1," "2," "3," "4," "5," "6," "7," "8," "9," "10," "11," "12," "13," "14," and "15") of the tree 304 have a hierarchical organization, in that the node represented by the data value of "0" has a relationship with another node "1," which itself may have a further relationship with other nodes "2" and "3,", and so on. Thus, the nodes may be divided into groups and sub-groups, which ultimately all have a relationship to the root or head node "0." To define a tree more formally, a tree data structure defines the hierarchical organization of nodes. Hence, a tree is a finite set, T, of one or more of nodes, such that a) one specially designated node is called the root of the entire tree; and b) the remaining nodes (excluding the root) are partitioned into m>=0 disjoint sets $T_1, \ldots Tm$, and each of these sets is in turn a tree. The trees T1, ..., Tm are called the subtrees of the root.

Thus, every node in a tree is the root of some subtree contained in the whole tree. The number of subtrees of a node is called the degree of that node. A node of degree zero is called a terminal compute node or a leaf. A non-terminal node is called a branch node. The level (or depth) of a node with respect to T is defined by saying that the root node has level 0, and other nodes have a level that is one higher than they have with respect to the subtree that contains them. Each root is the parent of the roots of its subtrees, the latter are siblings, and they are also the children of their parent. Each root is an ancestor of all of the nodes in all of the root's subtrees. The nodes in the subtrees of a root node are the root's descendants. The root node of the entire tree has no parent node. Although the relationships between the data values are illustrated in FIG. 3 as represented by a tree, in another embodiment, they are more generally represented by a graph. A tree is an undirected graph in which any two nodes are connected by exactly one simple path. In other words, a connected graph without cycles is a tree.

Figure 4:
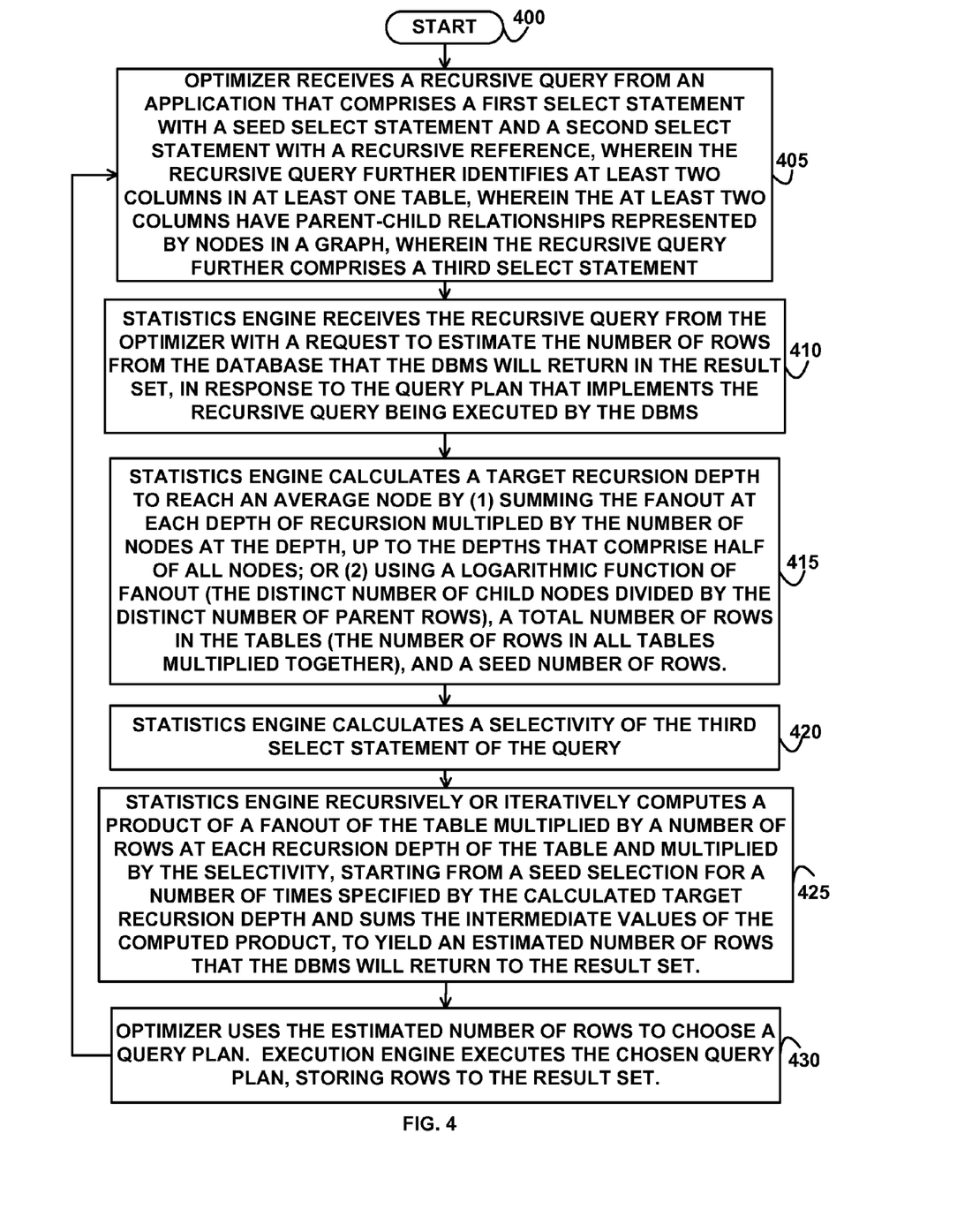
FIG. 4 depicts a flowchart of example processing for a recursive query, according to an embodiment of the invention.

FIG. 4 depicts a flowchart of example processing for a recursive query, according to an embodiment of the invention. Control begins at block 400. Control then continues to block 405 where the optimizer 215 receives a recursive query 158 from an application 160. The optimizer 215 determines that the recursive query 158 comprises a first select statement with a seed select statement and a second select statement with a recursive reference, wherein the recursive query 158 further identifies at least two columns in at least one table, wherein the data values stored in the rows in the at least two columns have parent-child relationships represented by nodes in a tree 304, which represents the organization of the row values in the table. In an embodiment, the recursive query 158 further comprises an optional third select statement.

Control then continues to block 410 where the optimizer 215 sends the recursive query 158 to the statistics engine 260, and the statistics engine 260 receives the recursive query 158 from the optimizer 215 with a request to estimate the number of rows from the database that the DBMS 150 will return in or save to the result set 152, in response to the query plan that implements the recursive query 158 being executed by the DBMS 150.

Control then continues to block 415 where, in an embodiment, the statistics engine 260 calculates the target recursion depth to reach an average node in the tree 304 by summing the fanout at each respective recursion depth of the tree 304 multiplied by the number of nodes at each respective depth in the tree 304, for all the depths that, in aggregate, comprise half of all of the nodes in the tree 304. That is, an aggregation of each respective recursion depth of the tree 304, for which the summing is performed, comprises all recursion depths of the tree 304 that comprise half of all of the nodes in the tree 304.

An example of such a calculation is given by the following pseudo code, where: N is the total number of nodes in the tree 304; i is the recursion depth; $C_i$ is the number of child nodes in the tree 304 at recursion depth i; and $P_i$ is the number of parent nodes in the tree 304 at recursion depth i.

```
{nodes_at_depth_i=1;
total_nodes_visited_thru_i=1;
i=0;
while (total_nodes_visited_thru_i < N/2)
    {
    i = i + 1;
    nodes_at_depth_i=nodes_at_depth_i * C_i/P_i;
    total_nodes_visited_thru_i = total_nodes_visited_thru_i +
        nodes_at_depth_i;
    }
target_recursion_depth = i;}
```

Thus, after the above pseudo code completes, the target_recursion_depth contains the approximate or target recursion depth needed to reach or read the average node in the tree 304 (or to read half the nodes in the tree 304). Thus, in an embodiment, an aggregation of each recursion depth of the graph, for which the summing is performed, comprises all recursion depths of the graph that comprise half of all of the nodes in the graph. In another embodiment, the pseudo code may use N instead of N/2, so that the target_recursion_depth contains the approximate or target recursion depth needed to read all nodes in the tree 304. Thus, in an embodiment, an aggregation of each recursion depth of the graph, for which the summing is performed, comprises all recursion depths of the graph that comprise all of the nodes in the graph.

In another embodiment, the statistics engine 260 calculates the target recursion depth using a logarithmic function of fanout (the distinct number of child nodes divided by the distinct number of parent rows in the tree 304), a total number of rows in the tables (the number of rows in all tables multiplied together), and a seed number of rows, using the following values and example formula.

N is the total number of nodes in the tree 304.

i is the current recursion depth in the tree 304.

$N_0$ is a seed number of rows. In an embodiment, the statistics engine 260 calculates the number of seed rows using a frequent value list, to calculate the number of values in the table 245 that equal the value specified by the seed select statement 394. For example, the statistics engine 260 calculates the number of values in the table that equal "0" since the seed select 394 specifies a seed select value of "0."

C is the distinct number of child nodes in the tree 304.

P is the distinct number of parent nodes in the tree 304. Note that a node in the tree 304 may be both a parent node and a child node.

F is fanout of the tree 304, which equals C/P.

j is the target recursion depth to read the average node in the tree 304, i.e. the target recursion depth at which half of all the nodes in the tree 304 have been read. In another embodiment, j is the target recursion depth to read all nodes in the tree 304.

Representing reading the average number of nodes in the tree 304 in terms of fanout and a seed number of nodes yields:

$$\sum_{i=0}^{j} N_0 F^i = (N_0(1 - F^{j+1}))/(1 - F) = N/2$$

Solving for j (the target recursion depth) yields:

$j=\log_F[1-((N-NF)/2N_0)]-1$, where "$\log_F$" represents a logarithm having a base of F (fanout). The logarithm of a number is the exponent by which the base has to be raised to produce that number.

In another embodiment, j is the target recursion depth to read all nodes in the tree 304, so representing the reading of all nodes in the tree 304 in terms of fanout and a seed number of nodes yields:

$$\sum_{i=0}^{j} N_0 F^i = (N_0(1 - F^{j+1}))/(1 - F) = N.$$

Solving for j (the target recursion depth) yields:

$j = \log_F [1 - ((N-NF)/N_0)] - 1$.

In an embodiment, the statistics engine further modifies the target recursion depth by calculating a weighted average of the number of nodes at each recursion depth, up to the target recursion depth, to create a new recursion depth. The statistics engine, for example, calculates the new weighted average using the following formula, where j is the original target recursion depth, as calculated above, $N_i$ is the number of nodes at each respective recursion depth i (where i=0, 1, 2, ... j), N is the total number of nodes in the tree 304, and the weights are the respective depths of recursion for each respective number of nodes:

$(N_0*0 + N_1*1 + N_2*2 + \ldots + N_j*j)/N$=new target recursion depth, which is the average depth between arbitrary nodes.

Control then continues to block 420 where the statistics engine 260 calculates a selectivity of the third select statement 398 specified by the recursive query 158. The selectivity is the percentage of rows examined that survive, satisfy, or meet the criteria of the third select statement 398 and that are stored to the result set 152. In an embodiment, the statistics engine 260 uses the frequent value list in the statistics 255 to calculate the selectivity. Using the example of FIG. 3, if the third select statement 398 specifies "y.flag=true" and the frequent values list indicates that 60% of the values of y.flag indicate true, then the statistics engine 260 calculates the selectivity of the third select statement 398 to be 0.6. In an embodiment, if the recursive query 158 does not specify a third select statement, the statistics engine 260 uses a selectivity of "1."

Control then continues to block 425 where the statistics engine 260 recursively or iteratively computes a product of a fanout of the graph of the table 245 multiplied by a number of rows at each recursion depth of the graph of the table and multiplied by the selectivity, starting from a seed selection, for a number of times specified by the calculated target recursion depth and sums the intermediate values of the computed product, to yield an estimated number of rows that the DBMS 150 will return to the result set 152, in response to a query plan in the query plan cache 225 that implements the recursive query 158 being executed. In an embodiment, the statistics engine 260 computes the estimated number of returned rows via logic as illustrated by the following pseudo code, where F is the fanout=C/P=the number of child nodes in the tree 304 divided by the number of parent nodes in the tree 304; j is the target recursion depth (previously calculated above; T is the number of rows (nodes) read from the tree 304 at each subscript depth (depth [x] or depth [x-1]) of recursion; S is the selectivity (previously calculated above); seed is the seed number of rows, as previously calculated above; and estimate is the estimated number of returned rows.

{T[0]=seed;
For x=1 to j

{T[x]=T[x-1]*F*S;

Estimate=Estimate+T[x];}}

Control then continues to block 430 where the optimizer 215 receives the estimated number of returned rows from the statistics engine 260 and uses the estimated number of returned rows to choose a query plan. The execution engine 220 executes the chosen query plan, storing rows that satisfy the criteria of the query 158 that the chosen query plan implements to the result set 152. Control then returns to block 405, where the optimizer 215 receives the same or different recursive query 158 from the same or a different application 160, as previously described above.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A non-transitory computer-readable storage medium encoded with instructions, wherein the instructions when executed comprise:

receiving a recursive query that comprises a first select statement with a seed select statement and a second select statement with a recursive reference, wherein the recursive query further identifies at least two columns in at least one table, wherein the at least two columns have parent-child relationships represented by nodes in a graph, wherein the graph represents an organization of values in rows in the at least one table;

calculating a target recursion depth for the graph based on a fanout of the graph, wherein the calculating the target recursion depth further comprises summing the fanout at each recursion depth of the graph multiplied by a number of nodes at the each recursion depth of the graph;

estimating an estimated number of rows that the recursive query will return to a result set based on the target recursion depth; and selecting a selected query plan from among a plurality of query plans based the estimated number of rows.

2. The non-transitory computer-readable storage medium of claim 1, wherein an aggregation of the each recursion depth of the graph, for which the summing is performed, comprises all recursion depths of the graph that comprise half of all of the nodes in the graph.

3. The non-transitory computer-readable storage medium of claim 1, wherein an aggregation of the each recursion depth of the graph, for which the summing is performed, comprises all recursion depths of the graph that comprise all of the nodes in the graph.

4. The non-transitory computer-readable storage medium of claim 3, wherein the calculating the target recursion depth further comprises:
 calculating a weighted average of the number of nodes at the each recursion depth, up to the target recursion depth, wherein a weight for the number of nodes at the each recursion depth is the each recursion depth.

5. The non-transitory computer-readable storage medium of claim 1, wherein the recursive query further comprises a third select statement, and wherein the estimating further comprises:
 calculating a selectivity of the third select statement.

6. The non-transitory computer-readable storage medium of claim 5, wherein the estimating further comprises:
 recursively computing a product of the fanout of the graph multiplied by a number of rows at the each recursion depth of the graph and multiplied by the selectivity, starting from a seed selection, for a number of times specified by the target recursion depth and summing intermediate values of the product, to yield the estimated number of rows that will be returned to the result set.

7. The non-transitory computer-readable storage medium of claim 5, wherein the calculating the selectivity of the third select statement further comprises:
 calculating a percentage of the rows that satisfy the third select statement.

8. The non-transitory computer-readable storage medium of claim 1, wherein the estimating further comprises:
 iteratively computing a product of a fanout of the graph multiplied by a number of rows at the each recursion depth of the graph, starting from a seed selection, for a number of times specified by the target recursion depth and summing intermediate values of the product, to yield the estimated number of rows that will be returned to the result set.

9. A computer comprising:
 a processor; and
 memory communicatively connected to the processor, wherein the memory is encoded with instructions, and wherein the instructions when executed by the processor comprise
 receiving a recursive query that comprises a first select statement with a seed select statement and a second select statement with a recursive reference, and a third select statement, wherein the recursive query further identifies at least two columns in at least one table, wherein the at least two columns have parent-child relationships represented by nodes in a graph, wherein the graph represents an organization of values in rows in the at least one table,
 calculating a target recursion depth for the graph, wherein the calculating the target recursion depth further comprises calculating a logarithmic function of a fanout of the graph, a total number of rows in the at least one table, and a seed number of rows,
 estimating an estimated number of rows that the recursive query will return to a result set based on the target recursion depth, and
 selecting a selected query plan from among a plurality of query plans based the estimated number of rows.

10. The computer of claim 9, wherein the logarithm function has a base of the fanout of the graph.

11. The computer of claim 9, wherein the recursive query further comprises a third select statement, and wherein the estimating further comprises:
 calculating a selectivity of the third select statement.

12. The computer of claim 11, wherein the estimating further comprises:
 recursively computing a product of the fanout of the graph multiplied by a number of rows at each recursion depth of the graph and multiplied by the selectivity, starting from a seed selection, for a number of times specified by the target recursion depth and summing intermediate values of the product, to yield the estimated number of rows that will be returned to the result set.

13. The computer of claim 11, wherein the calculating the selectivity of the third select statement further comprises:
 calculating a percentage of the rows that satisfy the third select statement.

14. The computer of claim 9, wherein the estimating further comprises:
 iteratively computing a product of the fanout of the graph multiplied by a number of rows at each recursion depth of the graph, starting from a seed selection, for a number of times specified by the target recursion depth and summing intermediate values of the product, to yield the estimated number of rows that will be returned to the result set.

* * * * *